(12) United States Patent
Ghani

(10) Patent No.: US 12,458,030 B2
(45) Date of Patent: Nov. 4, 2025

(54) KNEADING MACHINE HAVING A TONGS LOCKING MECHANISM FOR FIXING A BOWL TROLLEY

(71) Applicant: DIOSNA Dierks & Söhne GmbH, Osnabrück (DE)

(72) Inventor: Hashem Ghani, Osnabrück (DE)

(73) Assignee: DIOSNA DIERKS & SÖHNE GMBH, Osnabrück (DE)

( * ) Notice: Subject to any disclaimer, the term of this patent is extended or adjusted under 35 U.S.C. 154(b) by 808 days.

(21) Appl. No.: 17/691,800

(22) Filed: Mar. 10, 2022

(65) Prior Publication Data
US 2022/0192202 A1 Jun. 23, 2022

Related U.S. Application Data

(63) Continuation of application No. PCT/EP2020/075202, filed on Sep. 9, 2020.

(30) Foreign Application Priority Data

Sep. 10, 2019 (EP) .................... 19196453

(51) Int. Cl.
    *A21C 1/00*      (2006.01)
    *A21C 1/14*      (2006.01)
    *B01F 35/42*      (2022.01)

(52) U.S. Cl.
    CPC ............ *A21C 1/149* (2013.01); *B01F 35/422* (2022.01)

(58) Field of Classification Search
CPC .............................. A21C 1/149; B01F 35/422
See application file for complete search history.

(56) References Cited

U.S. PATENT DOCUMENTS 4,514,833 A    4/1985    Dürr

FOREIGN PATENT DOCUMENTS

| | | |
|---|---|---|
| CH | 656 555 A5 | 7/1986 |
| CN | 106943923 A | 7/2017 |
| DE | 1201784 B | 9/1965 |
| DE | 2115415 A1 | 10/1972 |
| DE | 24 21 089 A1 | 11/1975 |
| DE | 29723882 U1 | 4/1999 |
| DE | 20 2008 014 044 U1 | 12/2008 |

OTHER PUBLICATIONS

Machine Translation of DE2115415 to Oelschläger (Year: 1972).*
Official Communication issued in International Patent Application No. PCT/EP2020/075202, mailed on Dec. 4, 2020.
Official Communication issued in International Patent Application No. PCT/EP2020/075202, issued on Mar. 15, 2022.
English translation of Official Communication issued in International Patent Application No. PCT/EP2020/075202, mailed on Dec. 4, 2020.

* cited by examiner

*Primary Examiner* — Anshu Bhatia
(74) *Attorney, Agent, or Firm* — Keating & Bennett, LLP

(57) ABSTRACT

A kneading machine includes a removable bowl trolley and a tongs locking device to fix the bowl trolley to the kneading machine. The tongs locking device includes tongs with two arms, which in a closed position fixes the bowl trolley in a predefined position and in an open position releases the bowl trolley for removal. The tongs locking device includes a linear drive with an adjustment direction and a lever system adjustable by the linear drive. The two arms of the tongs are rotatably mounted on a lever system and are adjustable by the linear drive between a closed and an open position of the tongs locking device.

12 Claims, 4 Drawing Sheets

KNEADING MACHINE HAVING A TONGS LOCKING MECHANISM FOR FIXING A BOWL TROLLEY

CROSS REFERENCE TO RELATED APPLICATIONS

This application claims the benefit of priority to European Patent Application No. 19196453.5 filed on Sep. 10, 2019 and is a Continuation Application of PCT Application No. PCT/EP2020/075202 filed on Sep. 9, 2020. The entire contents of each application are hereby incorporated herein by reference.

BACKGROUND OF THE INVENTION

1. Field of the Invention

The present invention relates to a kneading machine including a removable bowl trolley and a tongs locking device to fix the bowl trolley to the kneading machine.

2. Description of the Related Art

Kneading machines for doughs, in particular baking doughs, have a bowl of various sizes for dough masses of 100 to 3,000 kg, in particular up to 1,000 kg. The bowl itself can be driven in rotation. It can be part of a bowl trolley, which allows the bowl to be easily moved between individual processing stations. During the kneading process, the bowl trolley must be held in place so that it does not leave the intended position.

Hydraulically operated tongs locks are known for fixing the bowl trolley. The general disadvantages of such hydraulic drives are that leaks can occur in the lines and that the drives are considered susceptible to possible contamination. The viscosity of the hydraulic oil is also highly dependent on the outside temperature, and pressure losses occur due to the compressibility of the oil. All of these factors mean that hydraulic drives require a great deal of maintenance. In addition, special care is required when processing food. If the hydraulic drive leaks, hydraulic oil can escape and enter and contaminate the food dough. The hydraulic drives conventionally used in tongs locking are covered by a housing that almost completely surrounds the kneading machine to protect them from contamination. In the future, kneading machines shall feature an open concept in which only a few parts of the machine are actually covered by a housing and the remaining components, such as the tongs locking mechanism, are exposed. When cleaning the kneading machine, the exposed components must be easily accessible. In addition, it is desirable that the open design of the kneading machine have as few surfaces, edges, and corners as possible so that cleaning of the kneading machine can be done as easily and quickly as possible.

SUMMARY OF THE INVENTION

Preferred embodiments of the present invention provide kneading machines each including a tongs locking device to fix a bowl trolley to the kneading machine.

A kneading machine according to a preferred embodiment of the present invention includes a removable bowl trolley and a tongs locking device to fix the bowl trolley to the kneading machine, wherein the tongs locking device includes tongs with two arms, which in a closed position fix the bowl trolley in a predefined position and in an open position release the bowl trolley, the tongs locking device includes a linear drive with an adjustment direction and a lever system adjustable by the linear drive, and the two arms of the tongs are rotatably mounted on the lever system and are adjustable by the linear drive between a closed and an open position of the tongs locking device.

The force required for the tongs locking device can be transmitted from the drive to the tongs via the lever system. The drive can thus be significantly smaller in size and located at a greater distance from the tongs. The drive is thus better protected against contamination and the lever system can be easily cleaned, so that the tongs locking device is ideally suited for a kneading machine with an open concept.

The linear drive can be a pneumatic or hydraulic drive, for example. Preferably, the drive is an electric linear drive. Electric linear drives have the advantage that they do not require high maintenance and also have a housing that is easy to clean.

Preferably, the bowl trolley has a bowl that can be rotated about an axis of rotation and is preferably designed to hold food dough with dough masses of about 100 kg to about 3,000 kg, in particular up to about 1,000 kg, for example.

The lever system preferably includes swivel joints, in particular fork joints, which only allow movement in one plane.

It is advantageous if the lever system is connected to a first rod of the linear drive, in particular a cylinder rod, which can be displaced along its longitudinal direction (adjustment direction of the linear drive). The adjustment direction is preferably in radial direction to the longitudinal axis of the bowl trolley or rotation axis of the bowl, respectively.

In a preferred embodiment, the first rod is connected at one end to the lever system, in particular to a second rod and a third rod of the lever system, each connected via a fork joint, which have a common counterpart in which a fork head connected to the ends of the rods engages in each case, the first rod being held on the counterpart in a rotationally fixed manner.

The lever system is preferably symmetrical to the adjustment direction.

It is advantageous if a further joint is provided at one end of each of the second and third rods for connection to one arm of the tongs. However, it is also possible that the lever system includes further levers or lever portions or components.

For a defined movement of the arms, it is advantageous if the two arms of the tongs are each rotatably supported on the kneading machine, the resulting axes of rotation being oriented symmetrically to the direction of adjustment so that the force emanating from the linear drive is distributed evenly over both arms of the tongs. The distance between the axes of rotation is preferably between about 500 mm and about 700 mm, in particular between about 550 mm and about 620 mm, especially preferably about 590 mm, for example. The arrangement of the two tongs arms is preferably symmetrical to the longitudinal axis of the first rod, and the second and third rods are of equal length, preferably between about 200 mm and about 400 mm, in particular between about 240 mm and about 310 mm, particularly preferably about 270 mm, for example.

In case the first rod of the lever system is in a retracted position, the angle α between the second and the third rod is preferably between about 72° and about 90°, for example. In the extended position of the first rod, the angle α preferably increases to about 150°, for example.

Preferably, the linear actuator includes a ball screw drive, which protects against the ingress of dust, in the case of high-pressure cleaning with a small distance and high temperature of the water (hot water) used in the process.

To prevent damage to the linear actuator, in particular an electric linear actuator, a connection between the first rod and a cylinder rod of the linear actuator preferably includes a spring.

In the case of an electric linear actuator, the electric motor is preferably designed to have a dynamic load rating of between about 6 kN and about 7 kN, particularly preferably about 6.8 kN, for example. It preferably has a stroke of about 100 mm to about 150 mm, for example. Due to the lever action of the lever system, such an electric motor can apply the required holding force of preferably about 24 kN, for example.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
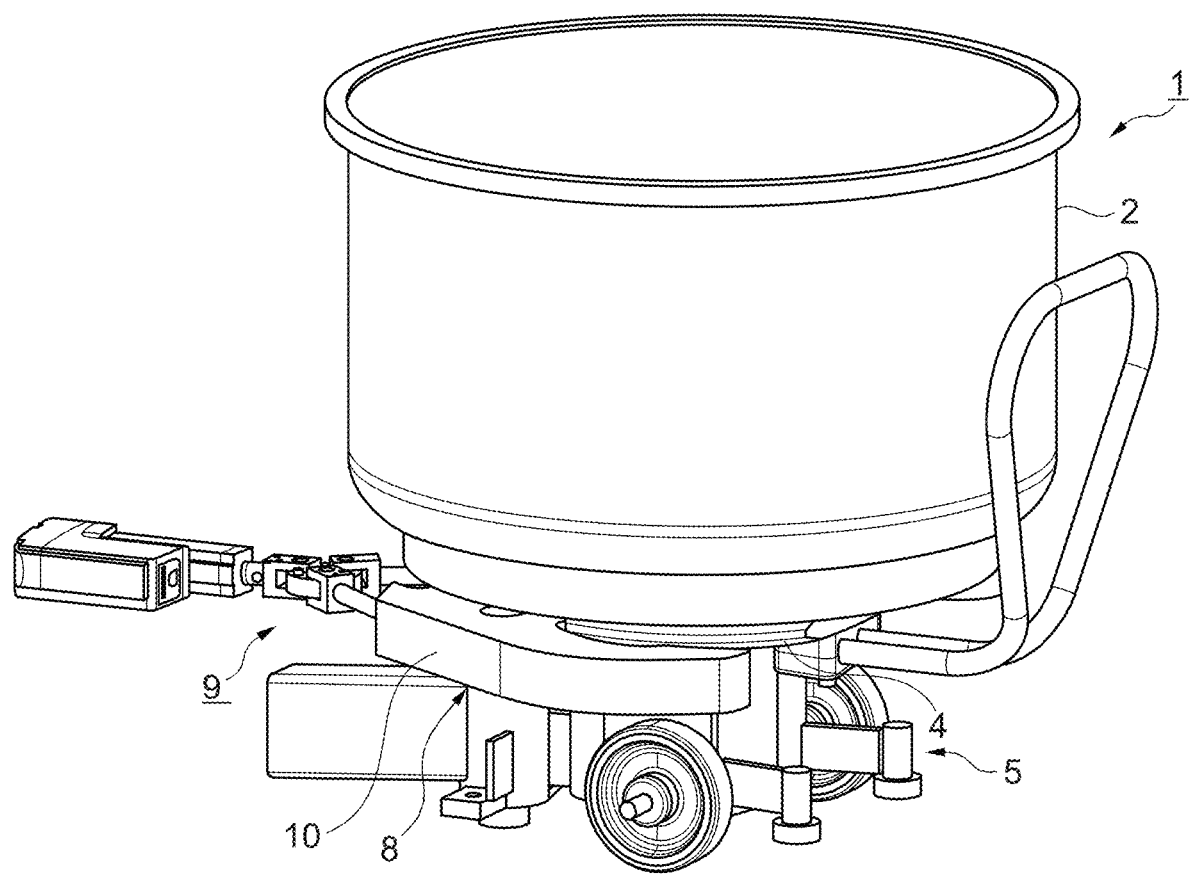
FIG. 1 shows a spatial representation of a bowl trolley of a kneading machine with a tongs locking device.
Figure 2:
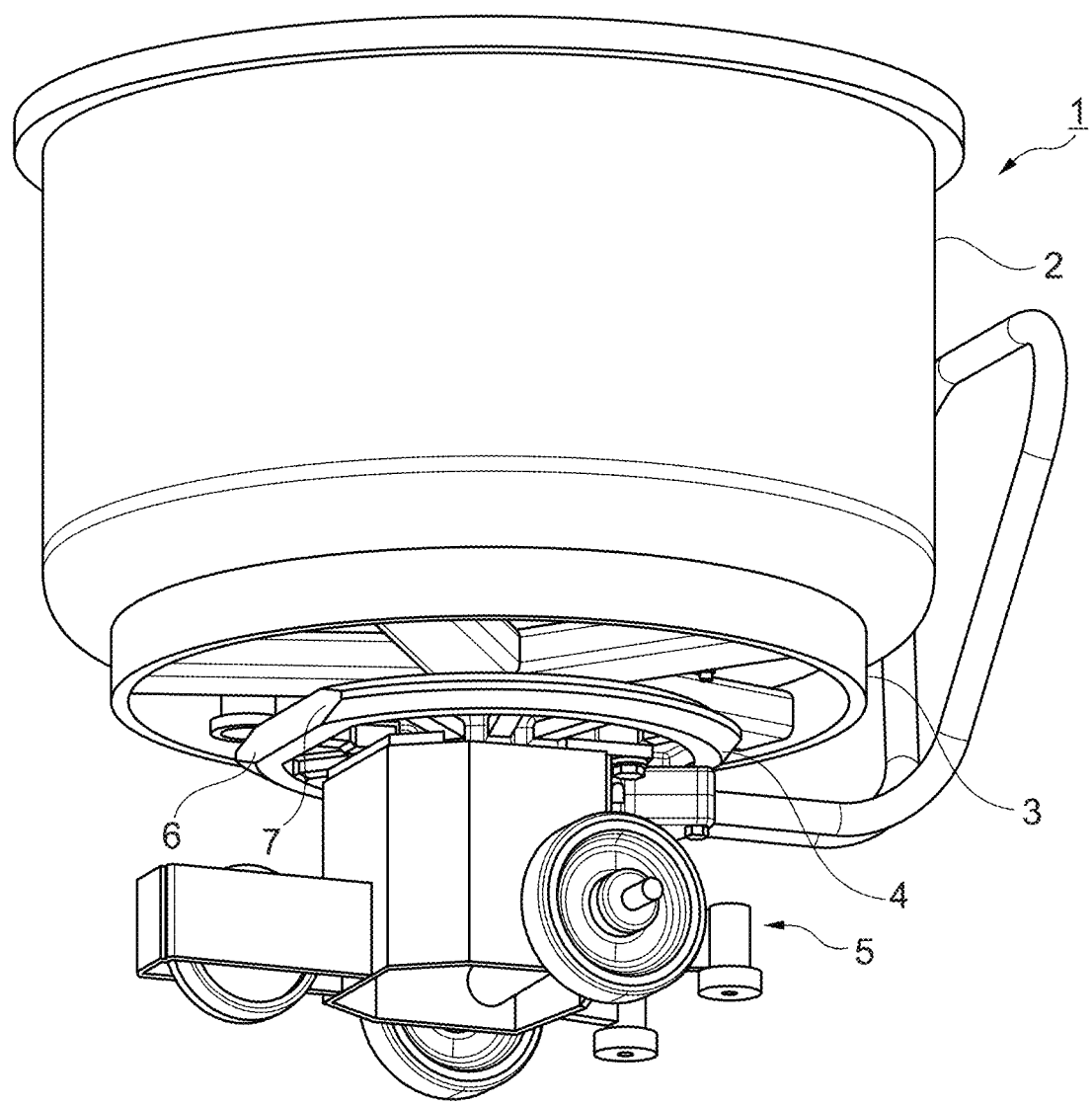
FIG. 2 shows a three-dimensional view from below of the bowl trolley of FIG. 1.

FIGS. 1 and 2 show a bowl trolley 1 with a bowl 2 connected to a shaft. A bowl disk 3 is seated on the shaft below the bowl 2, is connected to the shaft in a rotationally fixed manner and can be brought into operative connection with a friction wheel of a kneading machine to rotate the bowl. Below the bowl disk 3, the shaft is concentrically surrounded by a hub disk 4 which is connected to a base frame 5 of the trolley 1 and is thus held stationary. When the bowl 2 rotates, the hub disk 4 does not rotate with it. The hub disk 4 includes a non-circular area 6 which defines a plane effective surface 7. Matching this effective surface 7, a tongs 8 of a tongs locking device 9 includes a counter effective surface. During the closing process of the tongs locking device 9, the two effective surfaces are brought into contact. The effective surfaces are designed in such a way that the bowl trolley is lifted off the ground when the tongs locking device 9 is closed. Since the tongs 8 include two arms 10, a second non-circular region, which is not shown, is also provided on the hub disk 4 and likewise is an effective surface which can be brought into contact with a further counter effective surface of the tongs 8.

Figure 3:
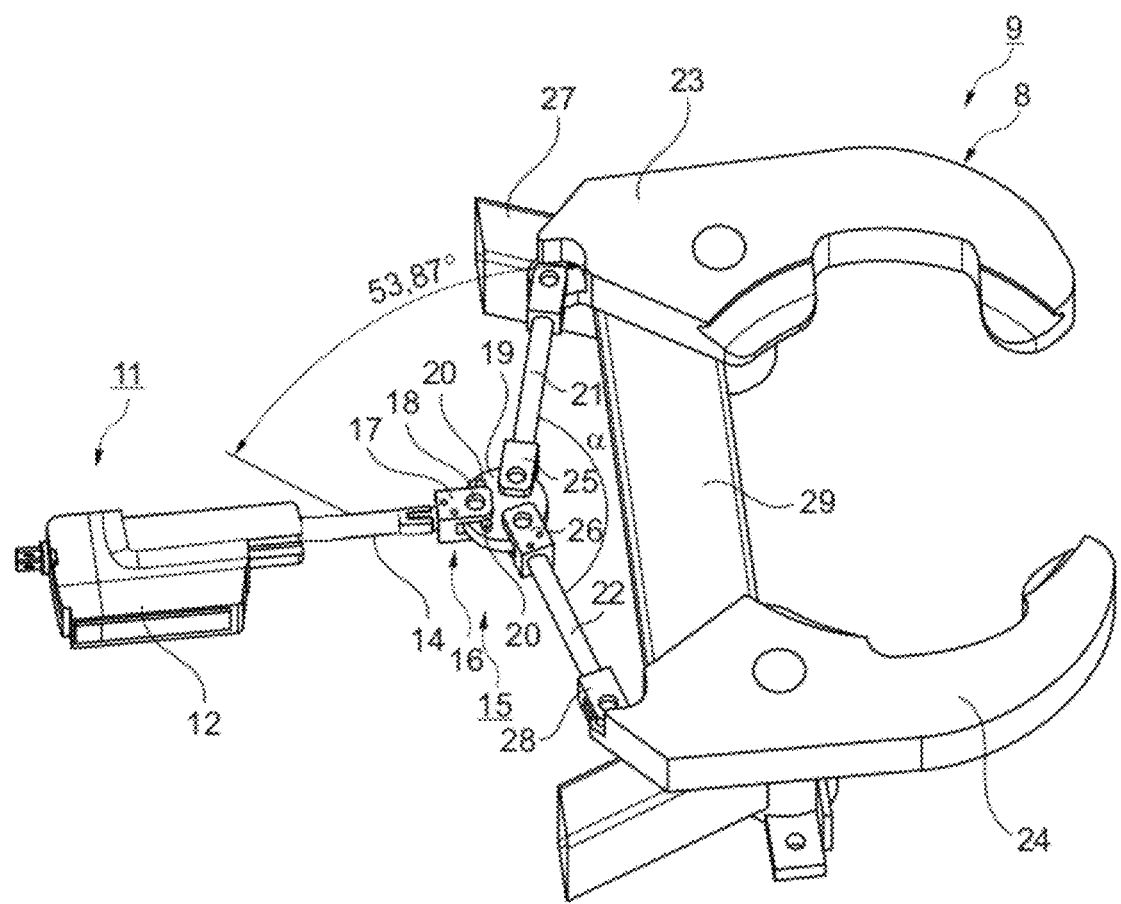
FIG. 3 shows a detailed view of the tongs locking device in the closed state.
Figure 4:
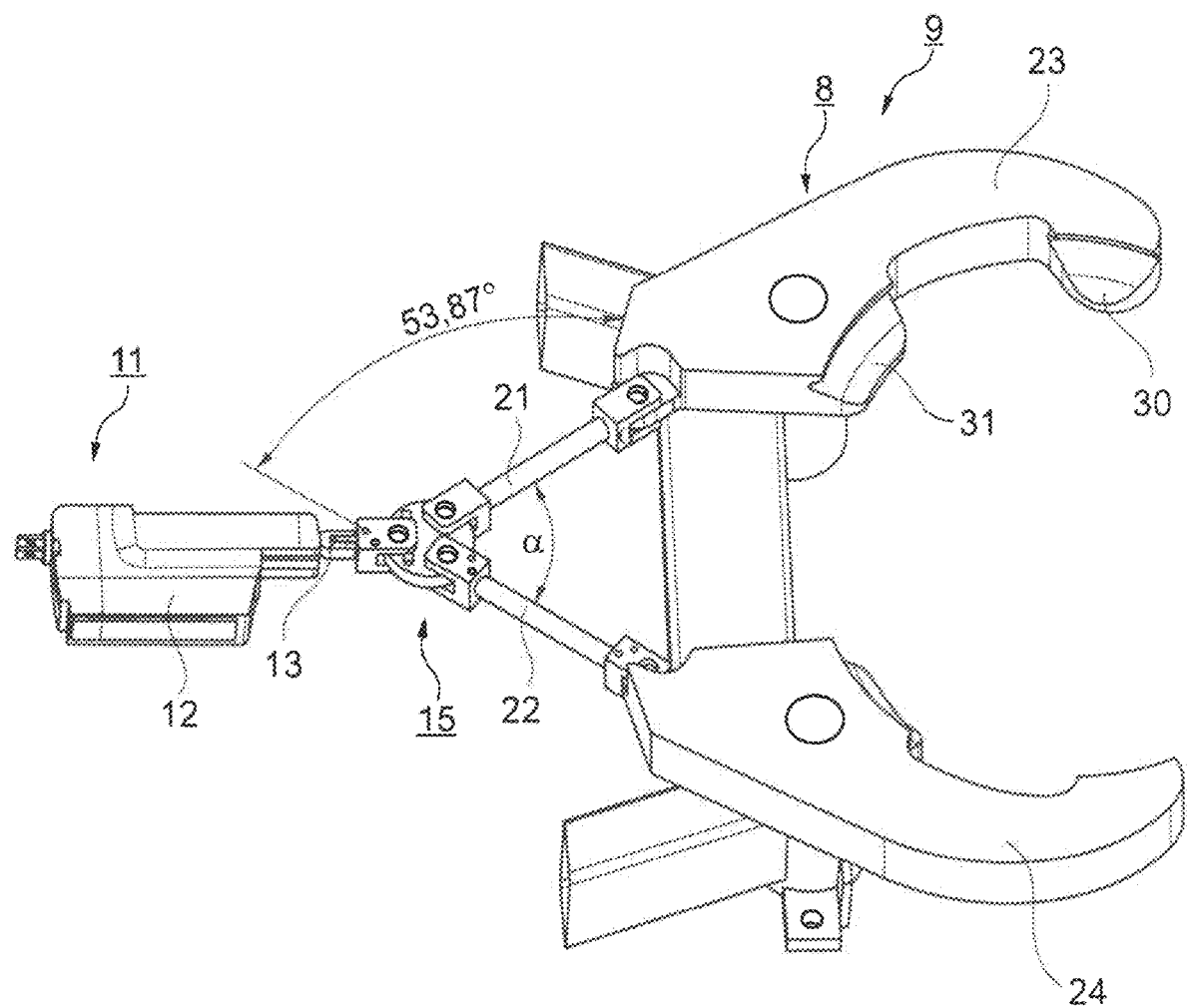
FIG. 4 shows a detailed view of the tongs locking device in the open state.

FIGS. 3 to 4 show in detail the tongs locking device 9. As shown in FIG. 3, when the tongs locking device 9 is closed, the tongs 8 grips the hub disk, which is not shown, circumferentially and thus ensures that the bowl trolley is held to the kneading machine and cannot move.

The tongs locking device 9 includes an electric linear drive 11 with electric motor 12, which moves the tongs locking device 9 or the tongs 8 from an open position to a closed position and vice versa. The electric motor 12 is a linear motor, which is connected to the lever system 15 by a first rod 14 via a connection 13. The first rod 14 can be moved linearly in both directions in the direction of the longitudinal axis of the rod 14 by the electric motor 12. The first rod 14 is preferably a cylinder rod and includes a connection 13 to a fork joint 16 at its end remote from the electric motor. At the end of the connection 13 remote from the electric motor, a clevis 17 of the fork joint 16 with a transverse bore 18 is fixedly attached, which in turn is connected to a counterpart 19 in a rotationally fixed manner. The counterpart 19 includes a corresponding bore. A bolt is inserted through the transverse bore 18 of the clevis 17 and through the congruent bore of the counterpart 19. Rotational movement of the clevis 17 is prevented by two projections 20 located on the surface of the counterpart 19, in that the projections 20 lie in abutment with the outer surfaces of the clevis 17. The counterpart 19 is substantially circular cylindrical in shape. The longitudinal axis of the counterpart 19 is perpendicular to the longitudinal axis of the first rod 14. Connected to the counterpart 19 are two other rods 21,22; the second and third rods 21,22, each of which supports an arm 23, 24 of the tongs 8. The second rod and third rod 21,22 are also connected to the counterpart 19 of the fork joint 16 via a clevis 25,26 at the end remote from the tongs. The second rod 21 and third rod 22 are held on the counterpart 19 so as to be pivotable about the axis of rotation in each case. The three clevises 17,25,26 are each held on the counterpart 19 of the clevis joint 16 offset by 120° or approximately 120° in the circumferential direction. The fork joint 16 is thus a triple fork joint. At the ends near the tongs, the second and third rods 21,22 each include a further clevis 27,28 which is fixedly connected to the respective rod end and which in each case receives a clevis counterpart at the end of the corresponding tongs arm 23, 24 to form a clevis joint.

The fork joints of the tongs locking device 9 are thus mounted in such a way that the tongs arms 23, 24 and the rods 14,21,22 of the lever system 15 move in a common plane with the adjustment direction of the electric linear drive, on which, in particular perpendicularly, the kneading tool of the kneading machine stands in the operating state or closed state of the tongs locking device.

To guide the movement of the two tongs arms 23, 24, these are rotatably held on a holding device 29, which is preferably part of a frame of the kneading machine. The spaced rotary axes are oriented parallel to the rotary axes of the fork joints. The distance between the axes of rotation is preferably between about 500 mm and about 700 mm, in particular between about 550 mm and about 620 mm, particularly preferably about 590 mm, for example. The arrangement of the two tongs arms 23, 24 is symmetrical to the longitudinal axis of the first rod 14. The second and third rods 21,22 are of equal length, preferably between about 200 mm and about 400 mm, in particular between about 240 mm and about 310 mm, particularly preferably about 270 mm, for example. The tongs arms 23, 24 are of mirrored design and the longitudinal axis of the first rod 14 lies centrally between the two axes of rotation of the tongs arms 23, 24. The force applied when closing the tongs 8 can thus be distributed evenly over the hub disk via the lever system 15.

FIG. 4 shows the open position of the tongs lock 9, in which the bowl trolley can be removed from the tongs 8. The first rod of the lever system 15 is in a retracted position. Only the connection 13 is visible in FIG. 4. The angle α between the second and third rods 21,22 in the retracted position is between about 72° and about 90°, for example. If the first rod 14 is now extended, the angle α increases to about 150°, for example, and the tongs arms 23, 24 are pivoted about the respective axis of rotation and moved towards each other so that the tongs 8 closes.

The tongs arms 23, 24 include projections 30,31 which engage in matching recesses in the hub disc of the bowl trolley to provide a locking action.

The electric motor 12 preferably has a dynamic load rating of between about 6 kN and about 7 kN, particularly preferably about 6.8 kN, for example. It has a stroke of about 100 mm to about 150 mm, for example.

The connection 13 between the first rod 14 and the lever system is designed to be elastic so that the process forces occurring during mixing and kneading are not transmitted to the electric motor 12 and damage it. It is conceivable to use a safety clutch that transmits or disengages the torque depending on the direction of the transmitting torque. It may also be envisaged to implement the elastic connection between the clevis 17 and the remaining elements of the lever system.

Due to the lever action of the lever system, a small electric motor is sufficient to apply the required holding force of about 24 kN, for example. Such electric motors are now available at low cost and thus represent a good alternative to a hydraulic drive. The use of an electric motor also has the advantage that it has an easy-to-clean housing. The lever system of the lever drive is also easy to clean.

In a further preferred embodiment, the lever system is preloaded in the closed position of the tongs lock. The pre-tensioning force must be overcome during the transition from the closed position to the open position. The pre-tensioning thus provides a safeguard against unauthorized manual opening of the tongs lock. In addition, the electric motor only has to apply force in one direction, which makes it more cost-effective.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A kneading machine comprising:
a removable bowl trolley; and
a tongs locking device to fix and immobilize the bowl trolley; wherein
the tongs locking device includes tongs with two arms which, in a closed position, fix and immobilize the bowl trolley in a predefined position and, in an open position, release the bowl trolley for removal; and
the tongs locking device includes a linear drive with an adjustment direction and a lever system adjustable by the linear drive, the two arms of the tongs being rotatably fastened to the lever system and being adjustable by the linear drive between a closed and an open position of the tongs locking device.

2. The kneading machine according to claim 1, wherein the bowl trolley includes a rotatable bowl to receive food dough with dough masses of about 100 kg to about 3,000 kg.

3. The kneading machine according to claim 1, wherein the lever system includes pivot joints allowing movement in one plane only.

4. The kneading machine according to claim 3, wherein the pivot joints are fork joints.

5. The kneading machine according to claim 4, wherein the lever system is connected to a first rod of the linear drive, which is displaceable along its longitudinal direction.

6. The kneading machine according to claim 5, wherein the first rod is connected to a second rod and a third rod of the lever system via a fork joint, which have a common counterpart in which a fork head connected to ends of the first, second and third rods engages, the first rod being held in a rotationally fixed manner on the common counterpart.

7. The kneading machine according to claim 6, further comprising an additional joint providing connection to an arm of the tongs at one end of each of the second and third rods.

8. The kneading machine according to claim 1, wherein the lever system is symmetrical to the adjustment direction of the linear drive.

9. The kneading machine according to claim 1, wherein the two arms of the tongs are each rotatably supported on the kneading machine and have axes of rotation oriented symmetrically to a direction of adjustment of the linear drive, so that a force emanating from the linear drive is distributed uniformly or substantially uniformly over both arms of the tongs.

10. The kneading machine according to claim 1, wherein the linear drive is an electric linear drive.

11. A kneading machine, comprising:
a removable bowl trolley; and
a tongs locking device to fix the bowl trolley; wherein
the tongs locking device includes tongs with two arms which, in a closed position, fix the bowl trolley in a predefined position and, in an open position, release the bowl trolley for removal:
the tongs locking device includes a linear drive with an adjustment direction and a lever system adjustable by the linear drive, the two arms of the tongs being rotatably fastened to the lever system and being adjustable by the linear drive between a closed and an open position of the tongs locking device; and
the linear drive includes a ball screw drive.

12. A kneading machine, comprising:
a removable bowl trolley; and
a tongs locking device to fix the bowl trolley; wherein
the tongs locking device includes tongs with two arms which, in a closed position, fix the bowl trolley in a predefined position and, in an open position, release the bowl trolley for removal:
the tongs locking device includes a linear drive with an adjustment direction and a lever system adjustable by the linear drive, the two arms of the tongs being rotatably fastened to the lever system and being adjustable by the linear drive between a closed and an open position of the tongs locking device; and
a connection between the linear drive and the lever system includes a spring.

* * * * *